July 16, 1963  H. J. HAGEMEYER, JR., ETAL  3,098,093
PROCESS FOR THE PRODUCTION OF ESTERS BY ALCOHOLYSIS
Filed Feb. 6, 1961
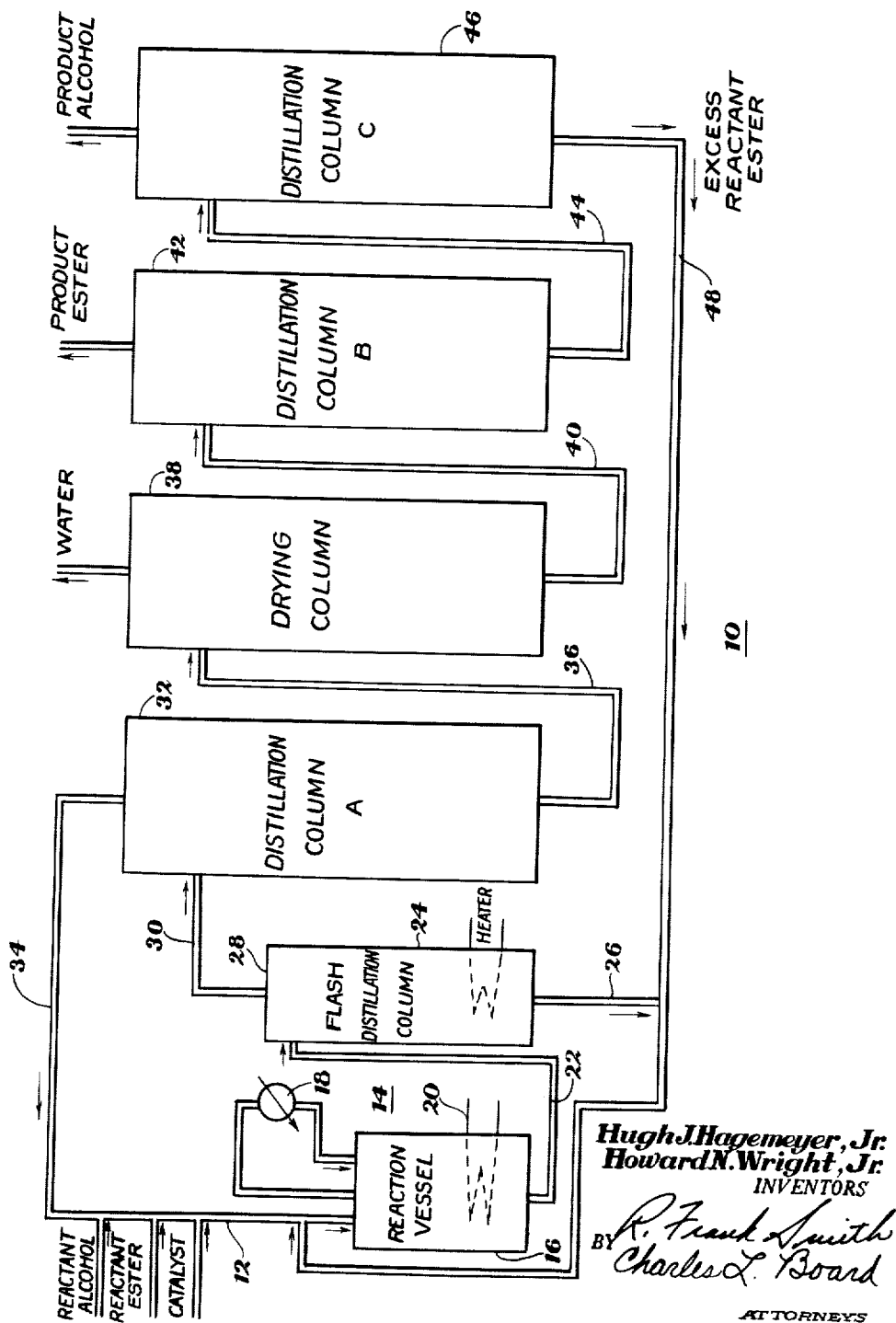
Hugh J. Hagemeyer, Jr.
Howard N. Wright, Jr.
INVENTORS
BY R. Frank Smith
Charles L. Board
ATTORNEYS

United States Patent Office 3,098,093
Patented July 16, 1963

3,098,093
PROCESS FOR THE PRODUCTION OF ESTERS BY ALCOHOLYSIS
Hugh J. Hagemeyer, Jr., and Howard N. Wright, Jr., Longview, Tex., assignors to Eastman Kodak Company, Rochester, N.Y., a corporation of New Jersey
Filed Feb. 6, 1961, Ser. No. 87,200
3 Claims. (Cl. 260—491)

This invention relates to the preparation of esters, and more particularly, to a continuous process for preparing esters by alcoholysis and continuously recovering the esters from the process.

This invention is particularly concerned with the interchange reaction between an ester containing 4 to 16 carbon atoms and an aliphatic alcohol containing 1 to 4 carbon atoms to produce an ester with fewer carbon atoms than that of the original ester.

The general process of alcoholysis, or ester exchange, is well known and is described in the prior art as an equilibrium reaction which can proceed to completion if one of the products can be separated from the reaction mixture.

The usual method for producing methyl or ethyl esters by alcoholysis consists of heating the alcohol with the ester in the presence of a catalyst. When the reaction reaches equilibrium, the catalyst is neutralized, filtered or destroyed, and the equilibrium mixture is separated by distillation. Actually, the equilibrium mixture is difficult to separate into its components and this is often the case when excess lower alcohol is employed in the ester-exchange reaction. The lower alcohol and the ester of the lower alcohol usually azeotrope and the separation of the product is thereby complicated.

An object, therefore, of the present invention is to provide a continuous ester interchange process which results in nearly complete conversion of the alcohol to product ester.

Another object of this invention is an improved ester interchange process for the continuous conversion of of isobutyl isobutyrate to methyl isobutyrate.

A more specific object of this invention is an improved process for carrying out the alcoholysis of an ester of the formula:

RCHR′CO₂CH₂CHR′R wherein R and R′ may be alkyl, cycloalkyl and arylalkyl with an alcohol of the formula R″OH, wherein R″ may be methyl, ethyl, isopropyl, propyl, isobutyl and butyl in the presence of an acidic or basic catalyst to produce an alcohol of the formula:

RCHR′CH₂OH and an ester of the formula:

RCHR′CO₂R″

Other objects will appear hereinafter.

In accordance with this invention, there is provided a continuous efficient method for producing esters from alcohols and esters by the ester exchange reaction with continuous recovery of the product ester.

For the purpose of facilitating a further description of the invention, the ester and alcohol selected for the alcoholysis are referred to hereinafter as the "reactant ester" and the "reactant alcohol," respectively. The products of the alcoholysis are referred to as the "product ester" and the "product alcohol."

Briefly, the process of this invention comprises heating to reaction in a suitable vessel about 1 mole of reactant alcohol and from about 2 to 9 moles of reactant ester in the presence of a catalyst until equilibrium is reached and there is provided an equilibrium mixture. The equilibrium mixture will comprise product ester, product alcohol, reactant ester, reactant alcohol, and catalyst. Owing to the fact that a relatively large amount of reactant ester is employed in the reaction as compared to the amount of reactant alcohol, substantially all of the reactant alcohol is reacted therewith and there is present in the equilibrium mixture a relatively small amount of reactant alcohol.

The reactant alcohols that can be employed in this invention have the structural formula R″—OH wherein R″ is an alkyl radical having from 1 to 4 carbon atoms. Examples of such alcohols include methanol, ethanol, propanol, isopropanol, n-butanol, and isobutanol.

The reactant esters that can be employed in this invention have the structural formula

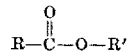

wherein R is selected from the group consisting of the hydrogen atom; alkyl radicals such as methyl, ethyl, propyl, isopropyl, n-butyl, pentyl, hexyl, heptyl, octyl and nonyl; cycloalkyl radicals such as cyclopentyl and cyclohexyl; aryl radicals such as phenyl and methyl phenyl; and arylalkyl radicals such as benzyl and methyl benzyl; and wherein R′ is a radical having at least two carbon atoms and can be selected from alkyl radicals having at least two carbon atoms such as ethyl, propyl, isopropyl, n-butyl, isobutyl, pentyl, hexyl, octyl, heptyl, and nonyl; cycloalkyl radicals such as cyclopentyl and cyclohexyl; and arylalkyl radicals such as benzyl and methyl benzyl. The total carbon atoms present in both R and R′ is from 3 to 15.

Examples of suitable esters therefore include ethyl acetate, propyl acetate, cyclohexyl propionate, ethyl phenyl acetate, benzyl butyrate, propyl n-valerate, octyl n-valerate, amyl n-heptoate, heptyl n-heptoate, octyl n-octoate, ethyl n-octoate, butyl isobutyrate, and ethyl n-octoate.

Not all combinations of the above enumerated reactant alcohols and reactant esters can be employed satisfactorily in carrying out this invention. In selecting the reactants, it is essential that the reactant ester employed have a boiling point higher than the boiling point of the next highest boiling component of the equilibrium mixture. For example, when ethyl butyrate is employed as a reactant ester propanol cannot be used as the reactant alcohol because the product ester produced (propyl butyrate) has a boiling point higher than ethyl butyrate. An equilibrium mixture comprising ethyl butyrate as the excess reactant ester and propyl butyrate as the product ester cannot be separated satisfactorily in a continuous separation process to be detailed hereinafter.

Thus, in carrying out the process, the R′ radical of the reactant ester will have at least one more carbon atom than does the R″ radical of the reactant alcohol.

After the equilibrium mixture has been produced, the catalytic property of the catalyst portion of the equilibrium mixture is rendered ineffective promptly whereby the high percentage yield of product ester that has been obtained, is maintained. The equilibrium mixture is subsequently separated into its several components.

Several methods can be used to render the catalytic property of the catalyst ineffective. Thus, the catalyst can be neutralized by the addition to the equilibrium mixture of a suitable neutralizing agent. For example, when sulfuric acid is employed as a catalyst, an amount of a water solution of sodium hydroxide can be added to the equilibrium mixture to react with the sulfuric acid to form sodium sulfate which is water soluble. The sodium sulfate can be subsequently removed from the equilibrium mixture by washing with hot water. Calcium oxide can be added to equilibrium mixture containing the sulfuric acid catalyst to form a calcium sulfate precipitate which can be removed from the equilibrium mixture by known methods. It is within the skill of those versed in the art to determine the amount and type of neutralizing agent to employ for the various types and amounts of catalysts that can be employed in this invention.

For the purposes of this invention it is preferred to render the catalyst ineffective by flash distilling from the equilibrium mixture substantially all the product ester. The catalyst employed is non-volatile at the temperature employed for flash distillation and remains as a portion of a residual composition. Such a method of rendering the catalyst ineffective is adaptable particularly for a continuous process of ester production to be detailed more fully hereinafter. It will be apparent that if flash distillation is to be employed a catalyst that is substantially non-volatile at the temperature employed in effecting the flash distillation must be employed.

Catalysts that can be employed in carrying out the alcoholysis reaction are basic and acid catalysts known in the art. Suitable catalysts include sulfuric acid, phosphoric, acid, p-toluene sulfonic acid, ethyl sulfuric acid, ethane sulfonic acid, aluminum chloride, zinc chloride, sodium isobutoxide, aluminum isobutoxide, and mixtures of acidic or basic catalysts. The amount of catalyst employed can be varied and will usually be employed in an amount equal to from about 0.1% to about 5% by weight based on the total weight of the reactants.

For the purposes of this invention, it is important that the reaction be allowed to proceed to equilibrium to provide an equilibrium mixture which comprises product ester, product alcohol, reactant ester, reactant alcohol, and catalyst. Immediately upon reaching equilibrium, a substantial portion of the equilibrium mixture is separated from the catalyst and subsequently separated into its several components.

This invention will be described hereinafter with respect to a commercially feasible continuous process for preparing the desired product ester. It will be understood, however, that each of the hereinafter described steps can be carried out separately if desired.

In describing the process of this invention, methanol will be referred to as the reactant alcohol and isobutyl isobutyrate as the reactant ester. It is to be understood that the reactant alcohols and reactant esters enumerated above can be employed.

Into an alcoholysis reactor or other suitable reaction vessel provided with a reflux condenser and heating means such, for example as a steam coil or stream jacket, there are added methanol, isobutyl isobutyrate, and catalyst in the desired amounts. The reaction vessel is heated slowly until reflux begins, usually at a temperature of from about 100° C. to about 120° C. Heating at reflux temperature is continued until equilibrium is reached, usually from about 2 hours to 3 hours, and there is provided an equilibrium mixture. The equilibrium mixture in the reaction vessel will comprise methanol, isobutanol, methylisobutyrate isobutyl isobutyrate and catalyst.

When equilibrium is produced, a fresh supply of methanol and isobutyl isobutyrate in substantially stoichometric amounts are added continuously to the reaction vessel. This fresh spply of reactants plus the amounts of reactants that are recycled (as hereinafter described) to the reaction vessel will supply the desired mole ratio of reactants to maintain the reaction. A fresh supply of catalyst is introduced into the reaction vessel when required. The feed rate of the fresh reactants and the recycled material is controlled so as to maintain a substantially constant volume of liquid in the reaction vessel.

The equilibrium mixture is removed continuously from the base of the reaction vessel and passed into a flash distillation column having heating means at the base thereof. Substantially all the catalyst and a relatively large amount of excess unreacted isobutyl isobutyrate are separated in this column from the other components that comprise the equilibrium mixture. Prompt and effective removal of the catalyst from the equilibrium mixture is an important and a critical part of this invention as hereinabove set forth.

The flash distillation column is preferably a baffled type distillation column, and is preferably operated under a reduced pressure of from about 10 to 17 inches of mercury. Atmospheric pressure can be employed, if desired. The reduced pressure can be obtained by means of an eductor or other suitable means. A circulating pump is employed to feed distilalte into the top of the eductor to provide the vacuum. Heat supplied by the heating means at the base of the column is closely controlled within a range of from about 130° C. to 139° C. so as not to char or decompose any of the components of the equilibrium mixture. A steam coil is a suitable heating means for use here and it has been determined that when 30 p.s.i.g. steam is passed through the steam coil, adequate heat is supplied and no charring or decomposition of the several components is observed.

Temperature at the top of the distillation column is maintained at about 100° C. to 120° C. Reflux ratio can be varied from about 3:1 to 1:1 with a ratio of about 1:1 being preferred.

The catalyst and isobutyl isobutyrate are removed together as a residual fraction from the base of the flash distillation column and recycled to the reaction vessel. The residual fraction will contain minor amounts of the other components of the equilibrium mixture. The residual fraction is removed at a sufficient rate so as to maintain a substantially constant volume thereof in the base of the column.

An overhead fraction comprising methanol, isobutanol (product alcohol), methyl isobutyrate (product ester), and isobutyl isobutyrate is removed from the top or head of the flash distillation column and is fed continuously into a distillation column A where susbtantially all the methanol is removed with a minor proportion of methyl isobutyrate (product ester) as a methanol-methyl isobutyrate azeotrope.

The distillation column A is operated at atmospheric pressure at a reflux ratio of from about 10:1 to 6:1 with an 8:1 ratio being preferred. Heat is supplied at the base of the column A by means of a steam coil or other suitable means so as to provide a temperature of from about 60° to 70° C. at the top or head of column A.

A residual fraction from column A comprising essentially methyl isobutyrate, isobutanol, and isbutyl isobutyrate is fed into another distillation column B where methyl isobutyrate is separated out and removed.

Prior to feeding the above residual fraction from column A into column B, the residual fraction can be passed through a drying column if desired; here any water present therein is substantially all removed. Satisfactory drying columns for this purpose are known in the art. This step in the process can be eliminated if anhydrous reactants are employed and anhydrous conditions are maintained in the system.

The overhead product that is removed in column B comprises from about 98% to 100% methyl isobutyrate.

Distillation column B is operated at atmospheric pressure and at a reflux ratio of 8:1 to 12:1 with a ratio of 10:1 being preferred. A base heater is provided in column B similar to that of column A. The base heater is maintained at a temperature sufficient to provide an overhead temperature of from about 90° C. to 100° C.

A residual fraction from column B comprising essentially isobutanol and isobutyl isobutyrate is fed into distillation column C where isobutanol is removed as an overhead fraction, recovered and stored. A residual fraction comprising essentially all isobutyl isobutyrate is fed or recycled to the reaction vessel. Column C is operated at atmospheric pressure and at a reflux ratio of from 12:1 to 8:1 with a ratio of about 10:1 being preferred. A base heater is maintained at a temperature sufficient to provide an overhead temperature of from about 100° C. to 115° C.

For a more complete understanding of this invention reference is made to the following detailed desecription and drawing, in which the single FIGURE is a flow sheet showing a preferred method for carrying out the invention.

Referring now to the single FIGURE of the drawing, there is shown diagrammatically apparatus 10 that can be employed in carrying out the process of this invention. The methanol, isobutyl isobutyrate, and catalyst are charged through feed line 12 into alcoholysis reactor 14 comprising a reaction vessel 16, reflux condenser 18, and steam coil 20. The reactants are heated to reaction temperature by means of the steam coil 20 until equilibrium is reached.

The equilibrium mixture is withdrawn continuously from the bottom of reaction vessel 16 by conduit 22 and fed into flash distillation column 24 where it is separated into an overhead fraction and a residual fraction. The residual fraction comprises the catalyst and is recycled by conduit 26 to reaction vessel 16.

The overhead fraction is removed at the top 28 of the column 24 by conduit 30 and passed into fractional distillation column 32 where it is fractionated into an overhead fraction and into a residual fraction. The overhead fraction comprises the azeotrope of methanol and methyl isobutyrate and is recycled by conduit 34 to reaction vessel 16. The residual fraction comprises isobutyl isobutyrate, isobutanol, and methyl isobutyrate.

This residual fraction is fed by conduit 36 into drying column 38 where substantially all the water is removed therefrom. Water is removed as a 7% water-93% methyl isobutyrate azeotrope and is recovered in an overhead product decanter (not shown). As hereinbefore set forth, this column can be eliminated from the apparatus if substantially anhydrous reactants are employed and anhydrous conditions are maintained throughout the system. A residual fraction from the drying column is passed by conduit 40 into distillation column 42 where an overhead fraction comprising substantially all methyl isobutyrate is removed and recovered in a suitable container. A residual fraction comprising isobutanol and isobutyl isobutyrate is passed by conduit 44 into distillation column 46 where an overhead fraction comprising substantially all isobutanol is removed and recovered in a suitable vessel. A residual fraction comprises substantially all isobutyl isobutyrate and is passed or recycled by conduit 48 to reaction vessel 16.

It will be understood that the above reaction conditions, separation conditions, and the like are specifically for the preparation of methyl isobutyrate from methanol and isobutyl isobutyrate.

It is well within the skill of those versed in the art, having the benefit of the invention herein disclosed, to control the temperature, the pressure and the like of the various reaction vessels and separation columns so as to prepare and separate esters prepared from other reactants hereinbefore mentioned. Consideration must be given to the boiling points of the reactants and to the boiling points of the products produced in scheduling the above described separation procedure.

The examples that follow are illustrative of this invention.

EXAMPLE I

About five liters of a mixture comprising methanol, isobutyl isobutyrate and sulfuric acid (98%) is prepared. The mole ratio of methanol to isobutyl isobutyrate in the mixture is about 1 mole to 3 moles. The sulfuric acid is present in the mixture in an amount equal to about 1% by weight based on the total weight of the methanol and isobutyl isobutyrate.

The mixture is fed continuously into a 5-liter reaction vessel fitted with a reflux condenser and a steam jacket heater at a rate of about 1 liter per hour for a period of about 5 hours. Heat is applied at the base of the reaction vessel continuously during the addition of the mixture to provide for gentle boiling and reflux thereof. The reflux temperature varies from about 106° C. to 115° C. Heating under reflux conditions is continued for about 2½ hours after all the mixture had been added to provide an equilibrium mixture comprising the reactants and the products of the reaction.

The equilibrium mixture comprises, by weight, about 1.2% methanol, about 24.2% methyl isobutyrate, about 15.6% isobutanol, and about 58% isobutyl isobutyrate.

The equilibrium mixture is fed continuously from the reaction vessel into the bottom of a 6-inch long column packed with ¼ inch Berl saddles. The cross-sectional diameter of the column is 1½ inches. The column is provided with a heater at the base thereof. The heater is maintained at a temperature of about 137° C. and the temperature at the top of the column is maintained at a temperature of about 108° C. The equilibrium mixture is fractionated into an overhead fraction comprising, by weight, about 43.7% methyl isobutyrate, 24.1% isobutanol, about 24.7% isobutyl isobutyrate, and about 6.7% of a mixture comprising water and methanol. A residual fraction comprising, by weight, about 7.3% methyl isobutyrate, about 6.1% isobutanol, about 85.4% isobutyl isobutyrate, and substantially all the sulfuric acid contained in the original mixture remains in the base of the column. The base or residual fraction is recycled to the reaction vessel.

The overhead product is distilled to remove the methanol as a 75% methanol-25% methyl isobutyrate azeotrope and this azeotrope is recycled to the reaction vessel.

The methyl siobutyrate is subsequently recovered by fractional distillation in the manner hereinbefore described with reference to the single FIGURE of the drawing. About 85% of the methanol is converted to methyl isobutyrate and about 32.7% of the isobutyl isobutyrate is converted to methyl isobutyrate.

EXAMPLE II

Methyl isobutyrate is produced in a pilot plant to determine the commercial feasibility of the process of this invention.

Into a 200 gallon stainless steel reaction vessel there are introduced about 32 pounds of methanol, about 432 pounds of isobutyl isobutyrate, and about 4.5 pounds of 98% sulfuric acid to provide a mixture.

The mixture is heated slowly to reflux temperature (about 85° C. to 100° C.) and the mixture refluxed until an equilibrium mixture comprising the reactants and the products of the reaction is produced. The equilibrium mixture will comprise, by weight, from 46% to 56% isobutyl isobutyrate, from 24% to 28% methyl isobutyrate, from 18% to 22% isobutanol, and about 1% sulfuric acid.

The equilibrium mixture is withdrawn continuously from the base of the reaction vessel and substantially stoichometric amounts of methanol and isobutyl isobutyrate are added continuously to the reaction vessel. The stoichometric amounts of the above reactants plus the products that are recycled to the reaction vessel will maintain the total feed ratio at about 3 moles of isobutyl isobutyrate to each mole of methanol.

The equilibrium mixture is withdrawn and fed into the upper portion of a flash distillation column comprising five half baffles. This column is 10 feet high and has a cross-sectional diameter of about 20 inches. The base temperature of the flash distillation column is maintained at a temperature of about 137° C. and the overhead temperature is about 112° C. The reflux ratio is about 1:1.

The composition of the overhead fraction comprises, by weight, from 3% to 5% methanol, from 34% to 38% methyl isobutyrate, from 30% to 35% isobutanol, and from 25% to 30% isobutyl isobutyrate. The base or residual fraction comprises, by weight, about 85% isobutyl isobutyrate, about 15% of methyl isobutyrate plus isobutanol, and sulfuric acid. The residual fraction is recycled to the reaction vessel.

The overhead fraction is fed into a 12 inch x 30 feet fractional distillation column packed with 1 inch Berl saddles. This column is operated at atmospheric pressure and at a reflux ratio of 8:1. Top temperature is maintained at about 64° C. The overhead fraction comprises a 75% methanol-25% methyl isobutyrate azeotrope and is recycled to the reaction vessel.

The residual fraction is fed into an 18 inch x 50 feet fractional distillation column packed with 1-inch Pall rings. This column is operated at atmospheric pressure and at a reflux ratio of about 9:1. Overhead temperature is maintained at about 93° C. The overhead product comprises substantially methyl isobutyrate which is collected in a vessel and stored.

The residual fraction comprises essentially isobutanol and isobutyl isobutyrate. The residual fraction is withdrawn and passed into a 12 inch x 30 feet fractional distillation column packed with 1 inch Berl saddles. This column is operated at atmospheric pressure and at a reflux ratio of about 10:1. Top temperature is maintained at about 107° C. and the overhead product, isobutanol, is recovered and stored. The residual fraction which comprises substantially all isobutyl isobutyrate is recycled to the reaction vessel.

EXAMPLE III

A pilot plant is operated in substantially the same manner as that described in Example II except that 0.90 weight percent of p-toluene sulfonic acid is used as a catalyst and the temperature of the reaction vessel is maintained at about 90° C. During one 24 hour period, 307 pounds of methanol and 1405 pounds of isobutyl isobutyrate are introduced into the system. The recycled materials maintained the total ratio of reactants at a ratio of about 3 moles of isobutyl isobutyrate to 1 mole of methanol. During this 24 hour period 976 pounds of methyl isobutyrate and 677 pounds of isobutanol are produced. Table I below sets forth the analyses and yields obtained during this period:

*Table I*

|  | Methanol | Methyl Isobutyrate | Isobutanol | Isobutyl Isobutyrate |
|---|---|---|---|---|
| Composition of Feeds to Alcoholysis Reactor, percent by weight | 6.6 | 0.6 | 2.0 | 88.1 |
| Alcoholysis Reactor Composition, percent by weight | 2 | 28 | 22 | 48 |
| Flash Column Overhead Composition, percent by weight | 3 | 38 | 35 | 24 |
| Flash Column Base Composition, percent by weight |  | 3 | 5 | 91 |
| Overhead Product from Methyl Isobutyrate Separation Column, percent by weight |  | 99 | 1 |  |

Percent yield of methyl isobutyrate from methanol_____ 99.7
Percent yield of methyl isobutyrate from isobutyl isobutyrate____ 99.2
Percent yield of isobutanol from isobutyl isobutyrate_____ 95.0
Percent accountability of methanol_____ 99.7
Percent accountability of isobutyl isobutyrate_____ 97.1

EXAMPLE IV

About 32 grams of anhydrous methanol, 720 grams of isobutyl isobutyrate, and 3.8 grams of sodium methoxide are heated to reflux and refluxed for about 30 minutes to provide an equilibrium mixture. The sodium methoxide is neutralized with the addition of sodium bicarbonate to the mixture. The equilibrium mixture comprises, by weight, 0.7% methanol, 12% methyl isobutyrate, 8.9% isobutanol, and 78.5% isobutyl isobutyrate. This mixture contains 0.89 mole of methyl isobutyrate. The methanol-methyl isobutyrate azeotrope contained about 0.012 mole of methyl isobutyrate and the remaining 0.88 mole of methyl isobutyrate is recovered as substantially pure product.

EXAMPLE V

Substantially the same process of Example I is used to prepare ethyl isobutyrate from 1 mole of ethanol and 5 moles of isobutyl isobutyrate. The catalyst employed is p-toluene sulfonic acid in an amount equal to about 2% by weight based on the total weight of the ethanol and isobutyl isobutyrate. The equilibrium mixture comprises, by weight, 1.1% ethanol, 9.9% isobutanol, 14% ethyl isobutyrate, and 75% isobutyl isobutyrate. The conversion of ethanol to ethyl isobutyrate is about 84% and the conversion of isobutyl isobutyrate to ethyl isobutyrate is about 18%. The accountability of the reactants is about 99%.

EXAMPLE VI

Substantially the same process of Example I is used to prepare isopropyl isobutyrate from 1 mole of isopropanol and 5 moles of isobutyl isobutyrate. Para toluene sulfonic acid in an amount equal to about 2% by weight based on the total weight of the isopropanol and isobutyl isobutyrate is employed as a catalyst. The equilibrium mixture obtained comprises, by weight, 1.9% isopropanol, 7.65% isobutanol, 11.67% isopropyl isobutyrate, and 78.8% isobutyl isobutyrate. The conversion of isopropanol to isopropyl isobutyrate is about 70.5% and the conversion of the isobutyl isobutyrate to isopropyl isobutyrate is about 15%. The accountability of the two reactants is about 99.4%.

It will be understood that the above description and drawing are illustrative of the invention and not in limitation thereof.

We claim as our invention:

1. In the method for the continuous production of an ester product, the steps which comprise
   (1) continuously introducing into a reaction vessel containing a refluxing mixture substantially stoichiometric amounts of
      (a) isobutyl isobutyrate and
      (b) an alcohol having the structural formula $$R''\text{—OH}$$

wherein R'' is an alkyl radical of from 1 to 3 carbon atoms, said refluxing mixture being comprised of an equilibrium mixture of isobutyl isobutyrate, alcohol (b), an ester interchange catalyst, an ester reaction product, and isobutyl alcohol reaction product, said equilibrium mixture being derived by admixing and heating to reaction from 2 to 9 moles of isobutyl isobutyrate, 1 mole of alcohol (b), and an ester interchange catalyst,
   (2) feeding equilibrium mixture continuously from the the bottom of the reaction vessel into a flash distillation column heated at the base thereof and operating under reduced pressure and at a reflux ratio of about 3:1 to 1:1 wherein there is provided substantially immediately an overhead fraction comprised of isobutyl isobutyrate, alcohol (b), ester reaction product, and isobutyl alcohol and a residual fraction comprised of substantially all the catalyst carried over in the equilibrium mixture and isobutyl isobutyrate,
   (3) returning to the reaction vessel a continuous stream of the residual fraction at a rate sufficient to maintain a substantially constant volume thereof in the base of the flash distillation column,
   (4) feeding continuously the overhead fraction into a distillation column A operating at atmospheric pressure and at a reflux ratio of from about 10:1 to 6:1 and distilling therefrom an overhead fraction comprised of an azeotrope of alcohol (b) and ester reaction product whereby substantially all alcohol (b) is removed, (5) feeding continuously a stream of residual fraction comprised of isobutyl isobutyrate, ester reaction product, and isobutyl alcohol from the base of column A into a distillation column B operated at atmospheric pressure and at a reflux ratio of from 12:1 to 8:1 wherein an overhead product comprising substantially all ester reaction product is removed and there is provided a residual fraction comprised substantially of isobutyl alcohol and isobutyl isobutyrate, (6) feeding continuously a stream of residual fraction from the base of column B into a distillation column C operated at atmospheric pressure and at a reflux ratio of from about 12:1 to 8:1 wherein isobutyl alcohol is substantially all removed as an overhead fraction and there is provided a residual fraction comprised essentially of isobutyl isobutyrate, and (7) feeding continuously all the residual fraction from column C to the reaction vessel.

2. In the method for the continuous production of methyl isobutyrate, the steps which comprise (1) introducing continuously into a reaction vessel containing a refluxing mixture comprised of an equilibrium mixture derived by heating to equilibrium an admixture of (a) about 3 moles of isobutyl isobutyrate, (b) about 1 mole of methanol, and (c) sulfuric acid catalyst substantially stoichiometric amounts of isobutyl isobutyrate and methanol, said equilibrium mixture being comprised of isobutyl isobutyrate, methanol, isobutyl alcohol, and methyl isobutyrate, (2) withdrawing continuously from the bottom of the reaction vessel the equilibrium mixture and feeding it into a flash distillation column heated at the base thereof at a temperature of from about 130° C. to 139° C. and operating under reduced pressure and at a reflux ratio of about 3:1 to 1:1 wherein there is provided an overhead fraction comprised of isobutyl isobutyrate, methanol, methyl isobutyrate, and isobutyl alcohol and a residual fraction comprised of substantially all the catalyst carried over in the equilibrium mixture and isobutyl isobutyrate, (3) returning to the reaction vessel as a continuous stream the residual fraction at a rate sufficient to maintain a substantially constant volume thereof in the base of the flash distillation column, (4) feeding continuously the overheated fraction into a distillation column A operating at atmospheric pressure and at a reflux ratio of from about 10:1 to 6:1 and distilling therefrom an overhead fraction comprised of an azeotrope of methanol and methyl isobutyrate whereby substantially all methanol is removed, said distillation column A being operated at a head temperature of from about 60° C. to 70° C., (5) feeding continuously a stream of residual fraction comprised of isobutyl isobutyrate, methyl isobutyrate, and isobutyl alcohol from the base of column A into a distillation column B operated at atmospheric pressure and at a reflux ratio of 12:1 to 8:1 and having an overhead temperature of from about 90° C. to 100° C. wherein an overhead product comprising substantially all methyl isobutyrate is removed and there is provided a residual fraction comprised substantially of isobutyl alcohol and isobutyl isobutyrate, (6) feeding continuously a stream of residual fraction from the base of column B into a distillation column C operated at atmospheric pressure and at a reflux ratio of from about 12:1 to 8:1 and at an overhead temperature of from about 100° C. to 115° C. wherein isobutyl alcohol is substantially all removed as an overhead fraction and there is provided a residual fraction comprised essentially of isobutyl isobutyrate, and (7) feeding substantially all the residual fraction in column C to the reaction vessel.

3. The method of claim 2 wherein the flash distillation column is operated at a reflux ratio of 1:1, column A is operated at a reflux ratio of 8:1, column B is operated at a reflux of 10:1, and column C is operated at a reflux ratio of 10:1.

References Cited in the file of this patent
UNITED STATES PATENTS

| | | |
|---|---|---|
| 2,383,601 | Inman | Aug. 29, 1945 |
| 2,634,234 | Kuhrt | Apr. 7, 1953 |
| 2,911,420 | Brown et al. | Nov. 3, 1959 |

UNITED STATES PATENT OFFICE
CERTIFICATE OF CORRECTION

Patent No. 3,098,093                      July 16, 1963

Hugh J. Hagemeyer, Jr., et al.

It is hereby certified that error appears in the above numbered patent requiring correction and that the said Letters Patent should read as corrected below.

Column 3, line 23, after "phosphoric" strike out the comma; line 53, for "vesel" read -- vessel --; line 64, for "spply" read -- supply --; column 4, line 14, for "distilalte" read -- distillate --; column 6, line 38, for "siobutyrate" read -- isobutyrate --; column 8, line 28, for "11.67%" read -- 11.6% --; column 10, line 5, for "overheated" read -- overhead --.

Signed and sealed this 3rd day of March 1964.

(SEAL)
Attest:

ERNEST W. SWIDER

Attesting Officer

EDWIN L. REYNOLDS

Acting Commissioner of Patents